Patented Nov. 26, 1946

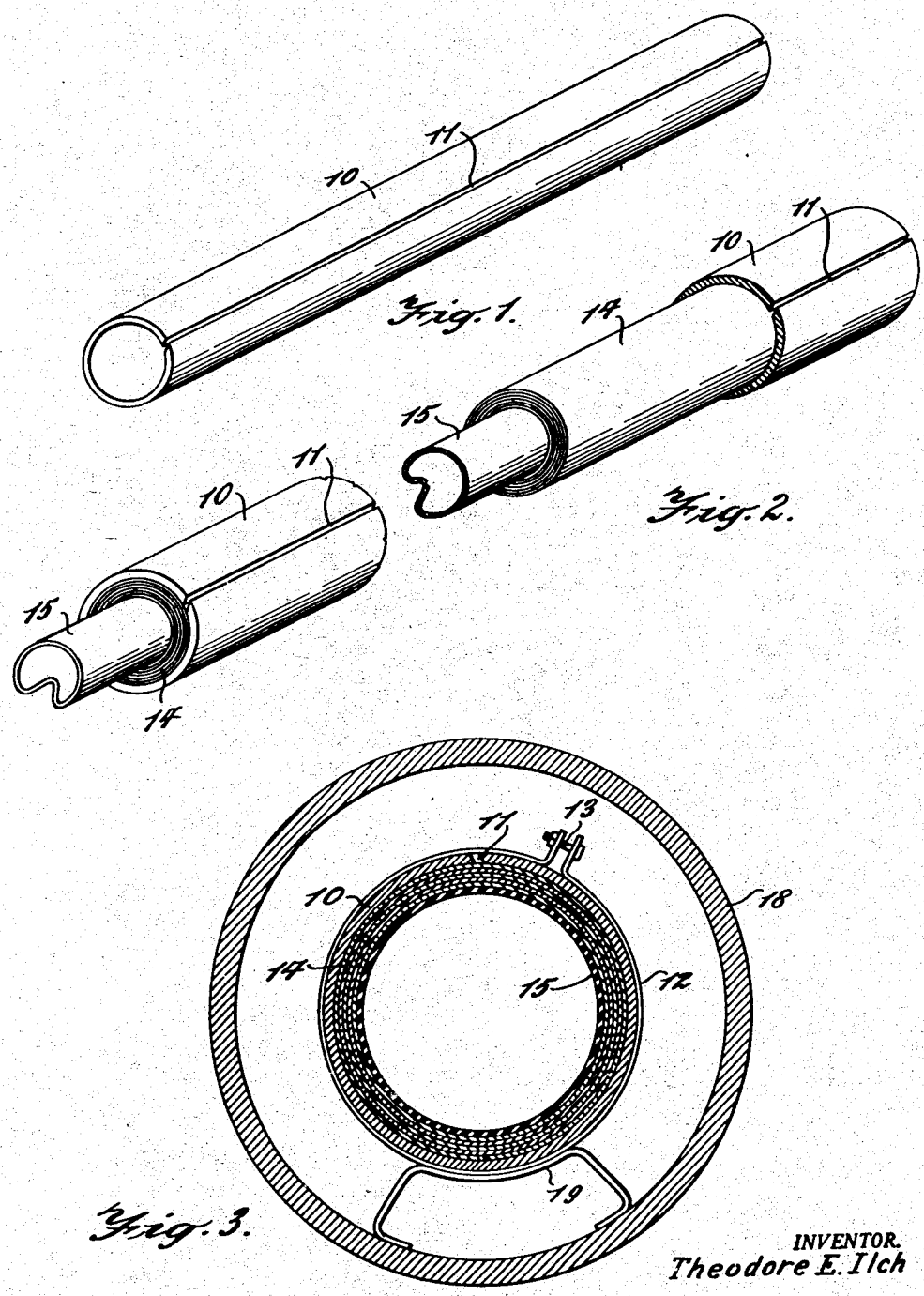

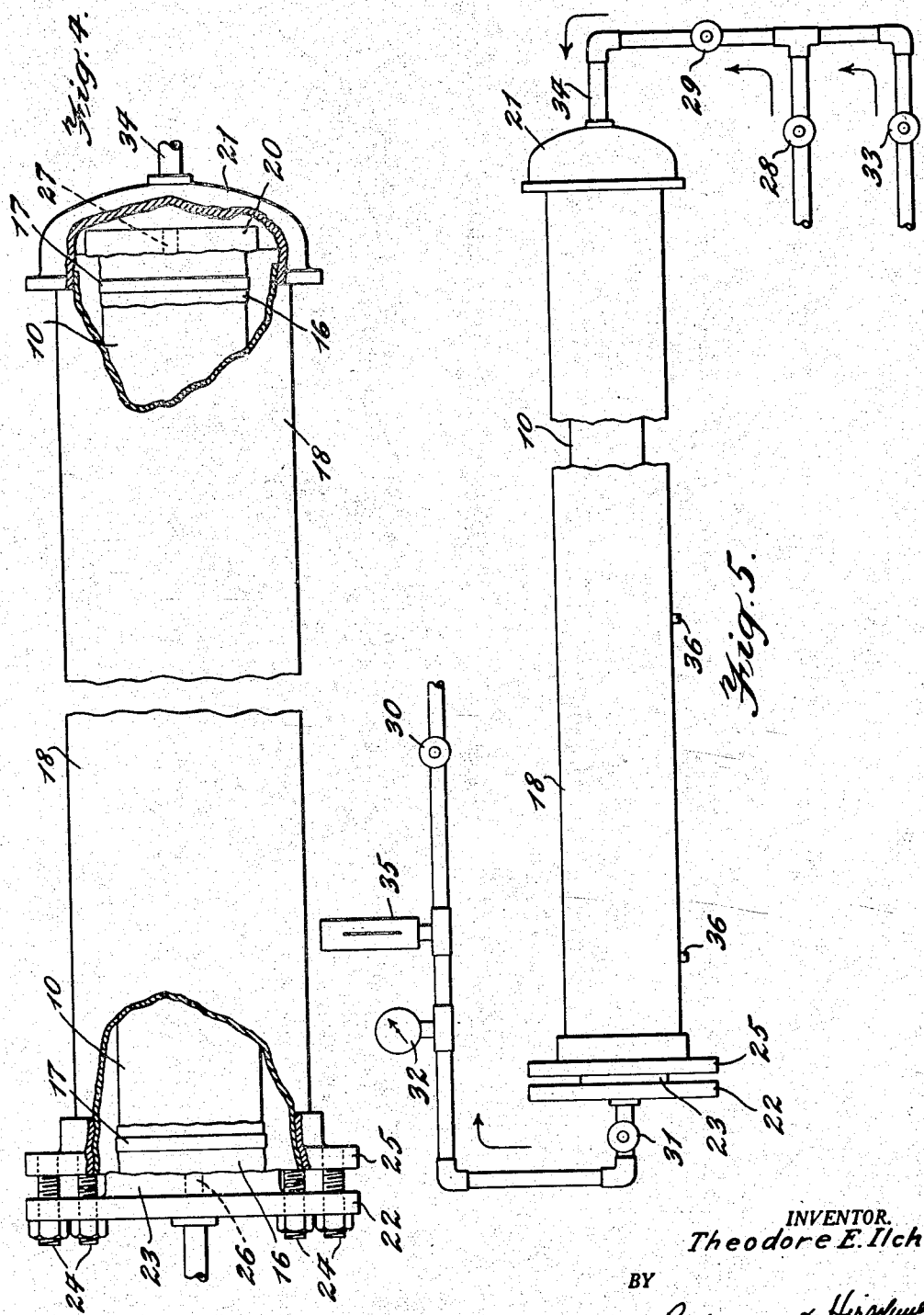

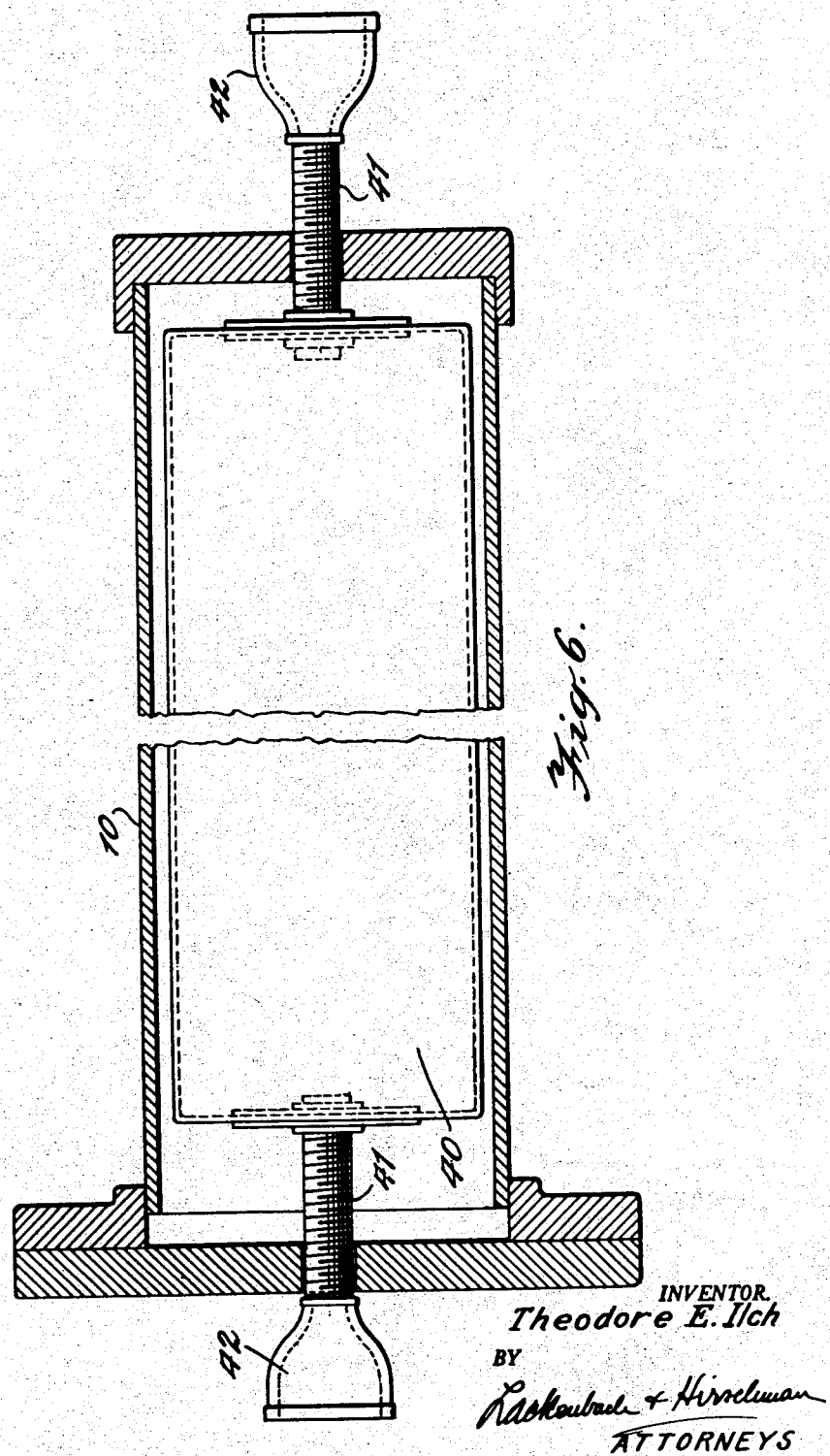

2,411,542

UNITED STATES PATENT OFFICE 2,411,542

METHOD OF MAKING PLYWOOD TUBING

Theodore Edward Ilch, Hempstead, N. Y., assignor to United States Plywood Corporation, a corporation of New York Application September 10, 1942, Serial No. 457,894

6 Claims. (Cl. 154—117)

The invention relates to plywood fabricated into the form of a pipe or tubing and more particularly to seamless plywood tubing. "Seamless," as hereinafter used throughout this specification, is intended to indicate the absence of any definite line of juncture extending from the interior to the exterior surface of the pipe or tubing.

An object of the invention is to produce such plywood tubing having the inherent advantages of plywood, but which by reason of its tubular form has extremely valuable industrial applications, for instance, as a structural member constituting a strong column or, by reason of its great strength in hoop tension as a pipe for conveying fluids under pressure. A further object of the invention is to provide a plywood tube whose length is considerably greater and in fact may be many times greater than the maximum transverse dimension of the tube, the tube being built up from individual veneer units. It is also an object of the invention to provide an improved process for the manufacture of such plywood tubing wherein the individual veneer units are not subjected to any peripheral compressive stresses during their assembly and particularly during the molding operation. Other objects will become evident from the further, more detailed description of the invention.

While attempts have been made by prior art workers to produce a more or less seamless plywood pipe or tubing, for instance by assembling such pipe or tubing from lumber or flat or bent plywood, such attempts have not been productive of a commercially utilizable tubing because of the inherent stresses characterising the material thus produced and because an inordinate amount of assembly work is involved in the production of such material. The primary cause of failure of such a product to take its place in industrial applications, however, has been its deficiency in strength both in the longitudinal direction and the transverse direction of the pipe. Furthermore, besides the unsatisfactory nature of the product heretofore produced, the fabrication involved extremely high costs and comparatively small production yield.

In accordance with my invention, I can produce economically and with excellent results so far as the necessary characteristics of strength are concerned, a variety of sizes of plywood pipe or tubing in lengths up to as much as 11 feet, so that these comparatively long structures can be used as a strong column, for instance, in the production of radio antenna masts. The tubing is characterized by great strength in a transverse direction and therefore considerable strength in hoop tension, thus being ideally suited for conveying fluids under considerable pressure. The strength of the tubing is controlled by the manner in which the grain is made to run in the layers of veneer. If the preponderance of grain of the wood is laid up to run longitudinally, the finished tubing will be preferably of value for use as a column, whereas if the preponderance of the veneer grain is made to run around the pipe, it will be more useful for carrying fluids under pressure. Obviously, for particular commercial applications, intermediate effects of strength can be secured, for instance by altering the thickness of the tubing or the number of veneers of which the tubing is constituted.

In its broadest aspects, my invention consists in the building up, and molding in its final and ultimate shape, a pipe or tubing, that is, hollow structures whose length is considerably greater than their diameters, by rolling up cylindrically into loose tubes, separately and in succession, a plurality of layers of veneers of plywood which have been suitably provided with layers of adhesive, sliding the thus rolled layers of veneers individually and successively inside a longitudinally split steel mandrel of suitable length through one of its two open ends, contracting the split mandrel to enable the finished article to be withdrawn more readily after the molding and after release of the mandrel, inserting a flexible fluid-tight membrane in the shape of a cylindrical tube inside the assembled veneers within the steel mandrel, and after placing the aggregate of mandrel, veneers, and membrane into a fluid pressure chamber, sealing the aggregate therein, applying heat and pressure by means of the membrane to the built-up veneers to cause the activation of the adhesive, with which it has been previously impregnated or coated, to thereby produce the plywood tubing.

A particular embodiment of my novel process of producing a plywood tubing and of an apparatus suitable for carrying out such process, are illustrated in the accompanying drawings, in which Fig. 1 is a perspective view of a steel mandrel or split tube into which the veneers in the carrying out of my process are adapted to be placed;

Fig. 2 is a cut-away view, also in perspective, showing the steel mandrel, the tubing constituted of a plurality of veneers in position within the mandrel, and the fluid-tight membrane or rubber fabric sleeve within the tubing;

Fig. 3 is an end view or section showing in concentric arrangement an outside casing with the split steel mandrel and its contents positioned therein;

Fig. 4 is a cut-away view showing the mandrel, ready for molding of the tubing therein, in position in the outside or cooking casing;

Fig. 5 is a schematic showing of the outside casing and necessary plumbing for the heat and pressure treatment; and Fig. 6 is a section through the outside casing or cooker with a modified sealing arrangement for the veneers in the split mandrel.

Referring more particularly to the drawings, in which similar reference characters identify similar parts in the several views, sheets of plywood veneer coated with a suitable adhesive, after drying, are curled or rolled up cylindrically and slid one after the other into the split steel mandrel 10 which is provided throughout its length with a slot 11 of suitable width. The sheets of veneers are accurately templated to the proper width so that when they are slipped into the steel mandrel, through one of its open ends, they will expand against and completely overlie the interior surface thereof, having neither an overlapping nor an appreciable gap between their adjacent free edges after they are forced into place. Each layer of veneers is accordingly a little narrower than the preceding layer slid into the mandrel. The butt joints in the several layers of veneers are very carefully arranged so that they do not occur at exactly the same point in the periphery of the tubing to be formed, but are distributed at various points throughout the periphery of the tubing. As a plurality of layers of veneers are used for the tubing, the completed molded tube will be, to all intents and purposes, seamless.

After successive sheets of veneers have been slid into the steel mandrel 10 and all of the plies are in place, clamps 12, distributed appropriately throughout the length of the steel mandrel, are tightened by the bolts 13, giving the mandrel the exact inside diameter desired, and which will be the outside diameter of the plywood tubing to be produced. The layers of veneers within the steel mandrel constitute the pipe 14 and will, after the heat and pressure treatment hereinafter described, form the molded plywood tubing. It will be understood that at the time that the mandrel is contracted, the veneers lie loosely within the mandrel, with many and considerable spaces between the individual veneers and between the first veneer and the mandrel. The degree of contraction of the mandrel is very small and is insufficient to create any peripheral compressive forces in any of the veneers. As already indicated, the purpose of the contraction of the mandrel is to provide a slight clearance between the same and the finished tube upon release of the mandrel at the end of the process.

A flexible, rubberized fabric or similar fluid-tight membrane in the shape of a cylindrical tube or sleeve 15 and which has both of its ends open, and is longer than the split steel mandrel 10, is then slipped or threaded into the steel mandrel within the assembled veneers, the ends of the sleeve being doubled back for a short distance over the outside of the mandrel, as shown at 16 in Fig. 4, and an outer ring or sleeve 17 is slipped on the folded back ends of the membrane to hold the fabric in place.

The mandrel assembly, now containing the plywood veneers and the sleeve, is then placed in position within an outer casing 18, being substantially centrally disposed therein by resting on a cradle 19. The mandrel assembly is pushed into the outer casing 18 until the end of the mandrel 10 abuts tightly against a gasket 20 positioned within and bearing against the head 21 of the casing 18. At the other end of the outer casing a companion plate 22, having a gasket 23 on its inner face is pressed against the end of the mandrel 10, a plurality of bolts 24 being used to press the companion plate 22 toward the end plate 25 of the casing. The bolts 24 being drawn up on the end plate, a tightening and sealing of both ends of the mandrel 10 is accomplished. In this manner, the whole of the sleeve 15 of the fluid-tight or rubberized fabric is sealed, except for an aperture 26 in the center of the gasket 23 and a like aperture 27 in the gasket 20 at the head end of the casing 18. These apertures 26 and 27 are for the admission and egress of the heating and cooling fluids.

After the sealing, thus accomplished, if fluid under pressure is admitted at one end, and the other end is closed the bag or sleeve 15 will be distended, forcing the veneers tightly against the interior surface of the mandrel 10 while the latter is in the transversely contracted condition. If these veneers have been previously coated with a heat-sensitive adhesive and if the fluid introduced is sufficiently hot to activate the adhesive, the veneers will be tightly bound together. Pressure resulting from heating of air or generation of vapor in the fibrous layers, is relieved through the narrowed slot 11 which still remains in the mandrel after contraction, as shown in Fig. 3. After sufficient exposure to heat has been obtained, the end plate 22 can be removed and the split tube or mandrel can be withdrawn from the outside steel casing. If the clamping device or clamps are then released, the mandrel will spring to its normal, larger diameter, the plywood tube which has been made can be withdrawn and is ready for treatment, assembly into useful articles or for sale without further treatment.

Describing the operations above outlined, and referring now particularly to Fig. 5, when the sealing, as above described, has been completed, air valve 28 and inlet valve 29 are opened, the exhaust valve 30 being closed. Exhaust valve 31 is generally left open. Air pressure through the inlet valve 29 is permitted to enter the casing until the pressure, as indicated by air pressure gage 32, is sufficient to cause the veneers inside the mandrel 10 to snap into place. An air pressure of approximately 50 pounds per square inch has been found in practice to be adequate for this purpose. The air valve 28 is then closed and the steam valve 33 is opened. Exhaust valve 30 is opened at the same time as the steam valve 33. The steam passing into the casing through the inlet valve 29 and inlet pipe 34 forces the air out, the temperature rising, as indicated by the thermometer 35, to approximately 300° F. The pressure is maintained purely by the pressure of the steam, or if it is desired to have the pressure higher without increasing the temperature, additional air may be admitted through the valve 28. A continual draining or bleeding of the system is permitted through the exhaust valve 30 to prevent stratification and to maintain the desired temperature.

The outside casing 18 is provided at a number of points throughout its length with vents 36, which permit any pressure built up between the outer casing 18 and the steel mandrel 10 to be continuously relieved. I have found that a minimum of two of these vents or small holes in the outer casing 18 is desirable for the proper carrying out of my process.

After a sufficient amount of heat has been imparted to the assembly within the casing to activate the thermo-sensitive adhesive, cooling in any suitable manner is effected if the adhesive or glue is a thermo-plastic adhesive. If the adhesive or glue used is thermo-setting, it is only necessary to release the pressure. The mandrel 10 is then removed from the outer casing 18, the clamps 12 loosened, the sleeve 15 removed, and the finished plywood tubing withdrawn from the steel mandrel 10.

The sizes of plywood tubing which may be fabricated in accordance with my process are limited only by the expediency and feasibility of handling and by the size of the apparatus. Plywood tubings in sizes ranging from one-half inch to six inches outside diameter have been produced successfully by means of the apparatus and in accordance with the steps hereinabove described. Apparently, there is no limit to the diameter of the tubing, except by convenience in handling and in the size of suitable apparatus. For instance, plywood tubing up to twenty-four inches outside diameter could be readily produced. So far as lengths are concerned, up to eleven feet have been in commercial production and in larger diameters even greater lengths can be produced with facility, economy, and satisfactory results, from the point of view of strength in both longitudinal and transverse directions.

While I have described hereinabove a specific embodiment of my invention, it is obvious that various changes in the specific arrangement of the several parts of the apparatus may be made without departing from my invention. For instance, in place of the flexible fluid-tight membrane or sleeve 15 open at both ends necessitating the doubling back of the excess at each end, there may be used a cylindrical tube very much like an automobile inner tube with both ends sealed. With such alternative structure, a valve stem would be utilized at each end having different sealing mechanism than that described.

In Fig. 6, I have shown in schematic cross-section, as the layers of veneers are omitted, such an alternative structure for attaining the sealing of the mandrel and veneers. In such alternative structure, a cylindrical pressure tube 40 of material, for instance rubber, such as is used in an automobile inner tube, is sealed at both ends, all seams of the tube being vulcanized, a valve stem 41 being provided at each end of the tube. The tube can then be inflated to distend the same against the layers of veneers, by air and/or steam pressure admitted and exhausted through valves 42, and subsequently deflated. The split mandrel 10, into which the veneers and sleeve or tube 40 have been placed is supported within the outer cooking casing in substantially the same manner as heretofore described in connection with the preferred embodiment of the apparatus.

Aside from the specific variation just described, other alternative forms of structure and details will be apparent to those skilled in the art. For instance, while I have described a specific arrangement of plumbing for the introduction of air and steam to the outer casing, it is obvious that, without departing from my invention, other methods of sealing the split steel mandrel with its enclosed sheets of veneer may be used for the application of heat and pressure to the veneers to bring them to the final molded condition by the activation of the glue.

It will be seen from the foregoing that I have provided a process for manufacturing plywood tubing wherein the tube is built up from a plurality of pliable veneer units which are inserted one by one, and endwise, into a relatively long, longitudinally split mandrel, the mandrel having substantially the outer contours and dimensions of the finished plywood article; and that in the course of the telescoping assembly of the veneer units preparatory to the inflation of the flexible membrane and likewise during the course of the molding, the veneer units are not subjected to any peripheral compression, i. e., no force is exerted on them from the outside to compel them to contract peripherally, the veneer units being at most subjected, aside from the radial pressure or the pressure normal to their surfaces, to a slight peripheral tension. Thereby buckling of the veneers is avoided while at the same time overlapping at the joints of the individual veneers is insured against.

I claim:

1. The method of forming an integral molded seamless tubing from fibrous sheet material which comprises introducing a plurality of layers of thermo-sensitive adhesive coated sheets of fibrous material into a relatively rigid cylindrical casing until the layers are built up in tubular form against the interior surface of such casing, the layers being coiled individually and introduced endwise in succession into the casing, and being allowed to expand in the casing and assume approximately the contour of the casing, applying a tubular membrane interiorly of the assembled sheets, and distending the membrane by a heat and pressure medium sufficient to press the sheets against the interior of the casing to bond the sheets to each other and to mold such sheets to the configuration of the casing.

2. The method of forming an integral molded seamless plywood tubing from wood veneers, which comprises applying a thermo-sensitive adhesive to a plurality of wood veneers, introducing successively narrower strips of such veneers one by one into a relatively rigid cylindrical casing through one end thereof, applying an expansible membrane interiorly of the assembled veneers, and distending the membrane with a heated medium at a pressure sufficient to press the veneers outward against the interior of the casing to mold them into a seamless plywood tube.

3. Process for the manufacture of seamless, multiply tubing of considerably greater length than diameter, which comprises coiling a sheet of flexible material to an average outside diameter less than the average outside diameter of the finished tube, inserting the so coiled sheet endwise into a long, relatively rigid tubular mandrel having inside transverse dimensions substantially equal to the outside transverse dimensions of the finished tube, and allowing the coiled sheet to expand within the mandrel and assume a tubular contour similar to that of the mandrel interior and substantially free from pressure stresses in the peripheral direction, similarly coiling and individually and successively inserting into the mandrel in endwise fashion an additional sheet or sheets of flexible material, the subsequently coiled sheets being allowed to expand against the previously inserted sheet within the mandrel, there being provided a layer of adhesive between adjacent sheets, then heating the assembled sheets and applying fluid pressure from the interior of the mandrel outwardly against the so telescoped fibrous tubes to cause activation of the adhesive and mold the sheets of flexible material against the interior surface of the mandrel and into an integral multi-ply tube, and removing the tube from the mandrel.

4. Process for the manufacture of seamless plywood tubing, which comprises coiling a wood veneer unit to an average outside diameter less than the average outside diameter of the finished tube, inserting the so coiled unit endwise into a relatively rigid tubular mandrel having inside transverse dimensions substantially equal to the outside transverse dimensions of the finished tube, allowing the coiled veneer units to expand within the mandrel and assume a tubular contour smaller than that of the mandrel interior and substantially free from pressure stresses in the peripheral direction, coiling and individually and successively inserting into the mandrel in endwise fashion an additional veneer unit or units, such last-mentioned individual coiled veneer units being each allowed to expand against the previously inserted unit within the mandrel, there being provided a layer of adhesive between adjacent units, and then heating the veneers and applying fluid pressure from the interior of the mandrel outwardly against the so telescoped veener tubes to cause activation of the adhesive and mold the veneer aggregate against the interior surface of the mandrel and into an integral multi-ply tube, and removing the plywood tube from the mandrel.

5. Process for the manufacture of seamless plywood tubing, which comprises cutting individual veneers to suitable dimensions, applying a thermo-sensitive adhesive to said veneers, coiling, in succession, such individual cut veneers about a longitudinal axis until the longitudinal edges overlap, the temporary tubes thus produced being of a diameter less than the final diameter of the molded seamless plywood to be produced, providing a tubular mandrel and inserting such temporary tubes endwise and in succession into the mandrel, permitting the veneers to expand within the mandrel whereby they assume a tubular shape with the longitudinal edges of each veneer tube in contiguous relation, inserting a flexible fluid-tight tubular membrane inside the assembled veneers within the mandrel, applying heat and sufficient pressure by means of said membrane to the built-up veneers to cause the activation of the adhesive and thereby mold the assembly of the veneers into an integral plywood tube having external dimensions corresponding to the internal dimensions of the mandrel, and removing the molded seamless plywood tube from the mandrel.

6. Process for the manufacture of seamless plywood tubing, which comprises cutting individual veneers to suitable dimensions, said veneers being provided upon certain of their outer surfaces with a thermo-sensitive adhesive, coiling, in succession, such individual cut veneers about a longitudinal axis until the longitudinal edges overlap, the temporary tubes thus produced being of a diameter less than the final diameter of the molded seamless plywood tube to be produced, inserting such temporary tubes endwise, and in succession, into a tubular mandrel with their longitudinal joints in staggered relation, permitting the veneers to expand within the mandrel whereby they assume a tubular shape with the longitudinal edges of each veneer in contiguous relation, inserting a flexible fluid-tight tubular membrane inside the assembled veneers within the mandrel, applying heat and pressure by means of said membrane to the built-up veneers to cause activation of the adhesive and thereby mold the assembly of veneers into an integral plywood tube while venting air and vapor through the mandrel, and removing the molded seamless plywood tube from the mandrel.

THEODORE EDWARD ILCH.